March 18, 1930.  S. B. HASELTINE  1,751,151
CAR CONSTRUCTION
Filed April 15, 1929
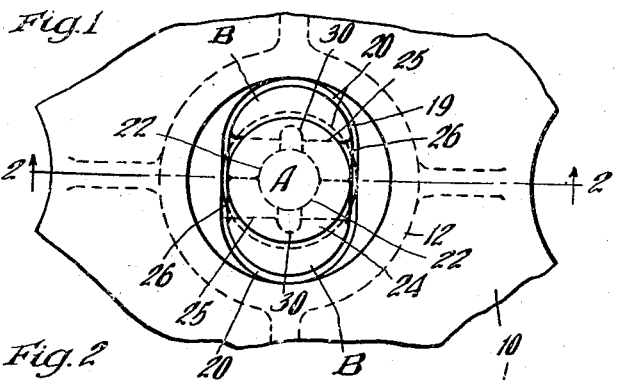
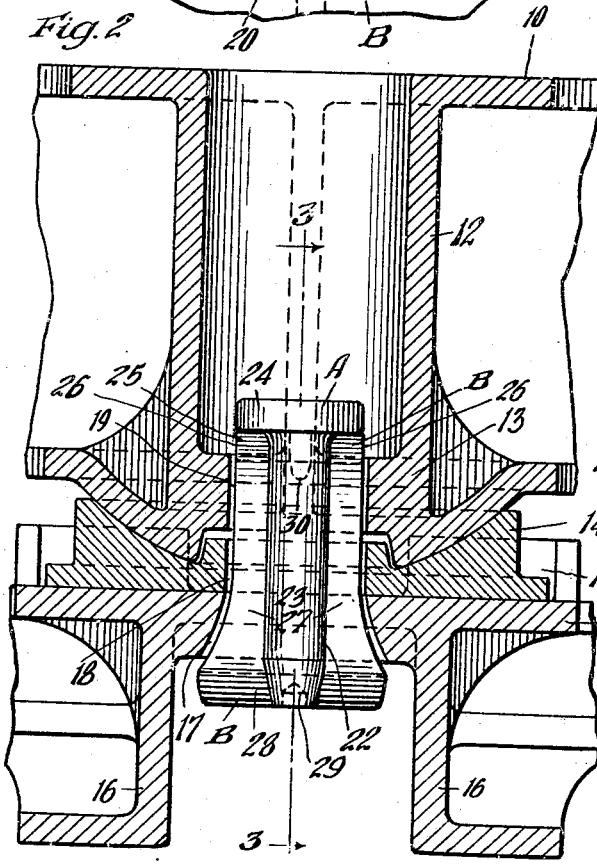
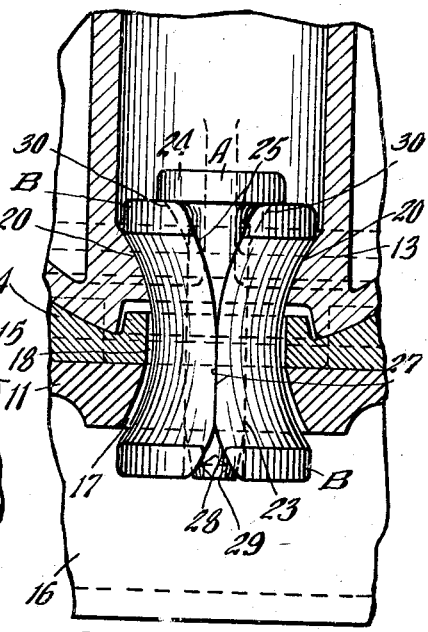
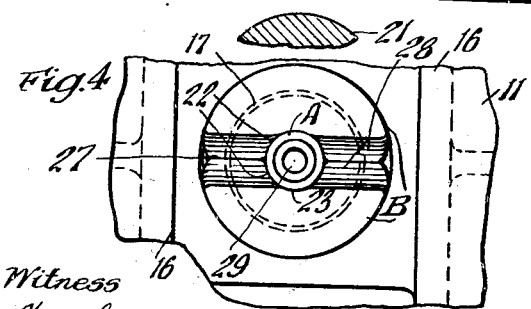
Inventor
Stacy B. Haseltine
By Joseph Harris
His Atty.
Witness
Wm. Geiger Patented Mar. 18, 1930

1,751,151

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

CAR CONSTRUCTION

Application filed April 15, 1929. Serial No. 355,031.

This invention relates to improvements in car construction.

One object of the invention is to provide a combined locking and center pin for bolsters of railway cars having aligned center pin receiving openings, especially designed for use in connection with trucks having an axle member disposed directly below the center pin opening of the truck bolster, the pin being formed of sections which may be readily applied in an upward direction through the truck bolster by insertion above the axle member.

Another object of the invention is to provide a combined locking and center pin construction for body and truck bolsters of railway cars having aligned center pin receiving openings, wherein the center pin member comprises two outer sections and a central filler member, the outer sections having laterally outwardly flared portions at opposite ends thereof cooperating with similarly flared wall portions of the openings of the body and truck bolsters to prevent separation of the bolsters, the outer sections being held in locking relation with the cooperating surfaces of the pin openings by the filler member which holds the sections against relative rocking or tilting movement, the outer sections when separated from the filler member being slidable while being tilted in said openings to allow withdrawal and application thereof while being rocked laterally to clear an obstruction, such as an axle member below, and in vertical alignment with the pin opening of the truck bolster, and wherein the outer sections are cut away at opposite sides at the upper ends thereof to pass freely through said openings.

A more specific object of the invention is to provide a combined locking and center pin of the character indicated, composed of two outer sections and a center filler member adapted to connect and lock together body and truck bolster members provided with aligned center pin openings, wherein the pin receiving openings have vertically curved opposed wall portions and the outer sections have similarly curved outer surfaces, whereby the same may be applied upwardly through the openings of the bolsters by sliding the same along the curved surface portions of the openings, thereby imparting a swinging tilting movement to the sections in an arcuate path to clear an axle or other obstruction disposed immediately below the center pin opening of the truck bolster, the center filler member, when in position between the outer sections, holding the flared portions thereof in locking relation with the flared portions of the center pin openings.

Other and further objects of the invention will more clearly appear from the description and claims hereinafter following.

In the drawing, forming a part of this specification, Figure 1 is a top plan view of a portion of the body and truck bolster construction of a railway car, showing my improvements in connection therewith. Figure 2 is a vertical sectional view, corresponding substantially to the line 2—2 of Figure 1. Figure 3 is a vertical sectional view through the body and truck bolsters, corresponding substantially to the line 3—3 of Figure 2. And Figure 4 is a bottom plan view of the construction shown in Figure 2.

In said drawing, 10 indicates generally the body bolster and 11 the cooperating truck bolster. The body bolster has the usual top and bottom web members and a tubular portion 12 connecting the top and bottom webs. At the bottom, the bolster 10 is provided with a depending bearing portion 13 having a spherical bottom bearing surface cooperating with a similar bearing surface provided on a block 14 mounted in a pocket 15 at the top of the truck bolster 11. The truck bolster also has top and bottom web members and longitudinally extending, spaced, vertical walls 16—16 connecting the web members and forming a channel opening. The body and truck bolsters, as well as the block 14, are provided with aligned openings adapted to receive the combined locking center pin.

In carrying out my invention, I provide the truck bolster with a downwardly flared pin receiving opening 17 which has upwardly curved, opposed wall portions; the opening 17 is preferably of circular cross section. The bearing block 14 is provided with a substantially circular opening 18 aligned with the upper end portion of the opening 17 of the truck bolster. The body bolster is provided with an opening 19 which is flared upwardly at opposite sides, as indicated at 20—20, the bottom end of the opening being of substantially circular cross section while the upper end portion is of somewhat oval formation in cross section, as most clearly shown in Figure 1. The opposed side wall portions 20 of the opening 19 are vertically curved, as shown, and transversely rounded on arcs of the same radius as the circular bottom portion of the opening.

It will thus be evident that the openings of the body bolster, the bearing plate 14 and the truck bolster together define a vertical bore adapted to accommodate a combined locking and center pin, the bore being of greater cross sectional area at the opposite ends thereof than at the central portion; in other words, having flared top and bottom end portions. As clearly illustrated in Figures 1 and 2, the flared upper portion of the opening 19 of the body bolster is of substantially the same width as the circular portion of said opening.

My improved combined locking center pin proper comprises, broadly, a central filler member A and two counterpart outer sections B—B which are so shaped as to have locking engagement with the flared openings of the body and truck bolsters of the car.

My improved combined locking and center pin is particularly adapted and designed for use in connection with trucks having an axle member disposed immediately below the center pin receiving opening of the bolsters, such as trucks of the six-wheel type. The axle of such a truck is indicated by 21 in Figures 2 and 3 of the drawing.

The counterpart sections B of my improved combined locking center pin form substantially half sections of the pin and, when applied within the pin receiving openings, fit said openings. On the inner side, each section B is provided with a vertical groove 22 which is of substantially semi-circular cross section, the grooves 22 of the two sections B registering when the parts are assembled and together forming a vertical bore adapted to receive the central filler member A.

The central filler member A has a cylindrical stem 23 adapted to fit the bore formed by the grooves 22, the stem 23 carrying a head 24 at the upper end thereof, adapted to cooperate with the upper ends of the sections B to limit downward movement of the filler member. The bottom end of the stem 23 is preferably tapered so as to facilitate insertion between the sections B.

The sections B, as most clearly shown in Figure 3, have vertically curved outer wall portions corresponding substantially in curvature to the curved surfaces of the pin receiving openings. Each section B is thus provided with enlarged portions at the opposite ends thereof, or, in other words, each section is flared outwardly at opposite ends. The sections B fit about the filler member A and have their inner edge portions 27—27 in substantial abutment, as clearly shown in Figure 3. At the upper ends, the members B are cut away on their inner sides, as indicated at 25—25, the cut-away portions being disposed on diametrically opposite sides of the filler member A. The edge surfaces of the cut-away portions are preferably curved, as shown, the curvature of the same being in this instance shown as concentric with the curvature of the corresponding outer surface portions at opposite sides of the sections B. The cut-away portions 25 provide clearance between the sections B when the filler member is omitted, to permit tilting movement of the sections with respect to each other, thereby facilitating application and removal of the sections. The inner edges of the members B are also cut away at the bottom ends as indicated at 28—28, to facilitate placing of the members B in the channel between the walls 16 of the truck bolster, the cross section of each member B at said cut-away portion being such that the same will pass freely between the axle 21 and the bottom corners of the walls 16 of channel opening.

As shown in Figure 1, the upper end portions of the sections B are cut away at opposite sides, as indicated at 26—26, to permit free insertion of the members B upwardly through the circular bottom end portion of the opening 19, the circular opening 18, and the circular upper end portion of the opening 17. The width of the upper end portions of the sections B is, as shown, slightly less than the diameter of the circular portions of the openings referred to. The bottom end portions of the sections B are of substantially uniform contour, that is, the cross section at any given point is substantially circular. As will be evident, when the parts of the pin are assembled with the filler member A disposed between the outer sections B, the latter will be locked against tilting movement and the curved surface portions thereof will be held in overlapping relation with the curved flaring surface portions of the pin receiving openings, thereby in effect providing a locking member tapered at the top and bottom ends and interlocked with similarly tapered openings.

When the filler member A is omitted, the sections B may be tilted with respect to each other, thereby facilitating application and removal of the same. In applying the sections B to the openings of the bolster, the sections are passed into the channel opening between the walls 16 by insertion through the space between the axle and the bottom corners of the walls 16 and then disposed at opposite sides of the opening in the truck bolster immediately above the axle member 21, with the upper end portions of the curved surfaces of the sections in engagement with diametrically opposed curved surface portions of the walls of the opening 17 of the truck bolster. The sections B are then slid along the curved surfaces of the walls of the openings while being pushed upwardly through the pin receiving openings.

As will be evident, the cooperating curved surface portions of the sections B and the pin receiving openings guide the sections in a substantially curved path, the sections being thus tilted or rocked with respect to the bolsters during the assembling operation. The curvature of the cooperating surfaces of the sections B and the pin receiving openings is such that the sections will entirely clear the axle member 21 while being applied upwardly through the opening of the truck bolster. When the sections B have been fully inserted within the openings, they assume substantially the position shown in Figure 3. The filler member A is then applied between the sections B by passing the same through the tubular section of the body bolster and engaging the stem 23 within the grooves 22 of the sections B.

In some types of cars the opening in the body bolster is not accessible from the top and in that case all of the parts of the pin including the filler member A are inserted upwardly through the opening in the truck bolster. Under such circumstances, the filler member is first inserted and is supported in the opening of the body bolster by a tool in the form of a rod, the upper end of which is engaged within a seat or pocket 29 provided at the bottom end of the member A. The sections B are then applied as hereinbefore pointed out and the filler permitted to drop between said sections by withdrawal of the supporting tool.

To provide clearance for the tool during insertion of the sections B, the latter are recessed on the inner sides as indicated at 30—30.

In case it is found necessary or desirable to separate the body and truck bolsters of the car, the filler member is removed and the sections B are then forced downwardly out of the openings while being guided along the curved surfaces of the pin receiving openings.

When the parts of my improved locking center pin are assembled, they form a substantially solid pin member which fills the pin receiving openings, thereby providing maximum resistance against transverse shearing. The tapered construction of the combined locking and center pin also serves to effectively interlock the same with the bolsters and further provide great resistance against tensile strains.

By grooving the inner sides of the sections of the pin and employing a cylindrical filler member a decided advantage is obtained in that the sections of the pin entirely surround and embrace the filler member and have their inner sides in abutment along the edges 27. The parts of the pin are thus held against relative displacement in the pin receiving opening.

From the preceding description taken in connection with the drawing, it will be evident that I have provided a center pin of exceptional strength which may be readily applied to the bolsters of a car and which substantially fills the circular pin receiving opening of the truck bolster bearing plate or block, thereby providing maximum cross sectional area at that point to resist shear. Further, by providing the flaring formation at opposite ends of the pin the bolsters are effectively locked against separation and a decided advantage is obtained over pins having heads at opposite ends which define abrupt shoulders, in that greater strength against tensile stresses is provided by the cooperating abutment surfaces of relatively large area presented by the flared portions.

While I have herein shown and described what I consider the preferred manner of carrying out my invention, the same is merely illustrative and I contemplate all changes and modifications which come within the scope of the claims appended hereto.

I claim:

1. In car construction, the combination with cooperating body and truck bolsters having aligned center pin receiving openings, the opening of the body bolster being of greatest cross sectional area at the upper end and the opening of the truck bolster being of greatest cross sectional area at the bottom end; of a locking center pin for connecting said bolsters, said pin being of greatest cross sectional area at the opposite ends thereof, said pin including outer sections adapted for rocking sliding movement on the walls of the center pin openings while being assembled and disassembled therewith; and a filler member interposed between said outer sections holding the same against sliding rocking movement and in interlocked relation with the body and truck bolsters.

2. In car construction, the combination with body and truck bolsters having aligned center pin openings, the opening of the body bolster being upwardly flared and the opening of the truck bolster being downwardly flared; of a combined locking center pin means, including a pair of outer members and a central filler member, each of said members extending through both openings, said outer members fitting said flared openings and being cut away at opposite sides to permit relative rocking movement therebetween when assembling the same with the bolsters, said filler member being disposed between the outer members and holding the same against rocking movement.

3. In car construction, the combination with cooperating body and truck bolsters having alinged center pin openings, the opening of the body bolster being of greater cross sectional area at the top than at the bottom end thereof, and the opening of the truck bolster being of greater cross sectional area at the bottom than at the top; of a combined locking center pin fitting said openings, said pin including outer members fitting the walls of said openings and an inner filler member holding said members against tilting movement, clearance being provided between one set of ends of said outer members to permit tilting movement thereof when said filler member is omitted, whereby said members may be inserted within said openings by sliding movement on the walls of the openings while imparting a tilting movement to said members.

4. In car construction, the combination with cooperating body and truck bolsters having aligned center pin receiving openings, the opening of said body bolster being flared upwardly and the opening of the truck bolster being flared downwardly; of a combined center and locking pin fitting said openings, said pin comprising counterpart outer sections and a filler member, said outer sections being slotted on their inner sides, the slotted portions together defining a central bore accommodating said filler member, said filler member fitting and substantially filling said bore, said outer sections being cut away at one set of ends at opposite sides of said bore to provide clearance to permit tilting of said outer members when said filler member is omitted while assembling of said sections with the bolsters.

5. In car construction, the combination with cooperating body and truck bolsters having aligned center pin receiving openings, the opening of one of said bolsters being flared; of a combined locking center pin, including counterpart outer sections and a central filler member, said counterpart outer sections and filler member extending through the openings of both bolsters, said outer sections being divided centrally of the pin and flared at one set of ends thereof to interlock with the flared opening and having means at the other set of ends thereof interlocked with the other bolster, said filler member being interposed between the outer sections and holding the same against tilting movement, said sections being cut away at one set of ends at opposite sides of the filler member to permit tilting movement of said sections with respect to each other when said filler member is omitted to provide clearance to permit insertion of said sections within the openings while tilting movement is imparted thereto.

6. In car construction, the combination with cooperating body and truck bolsters having aligned center pin receiving openings, the opening of the body bolster being upwardly flared and the opening of the truck bolster being downwardly flared, the opposite side walls of each opening being vertically curved; of a combined locking center pin, including counterpart outer sections and a central filler member, said counterpart outer sections and said filler member extending through the openings of both bolsters, said outer sections being divided centrally of the pin and having registering vertical grooves on the inner sides together defining a vertical cylindrical bore receiving and fitting said filler member, the outer surfaces of said sections being correspondingly curved to the surfaces of said openings and being held in engagement therewith by the central filler member, said sections being cut away at one set of ends at opposite sides of the central bore to permit tilting movement of the sections with respect to each other when said filler member is omitted to provide clearance to permit insertion of said sections within the openings by sliding the same along the vertically curved wall portions thereof.

7. In car construction, the combination with body and truck bolsters having aligned center pin receiving openings, the opening of the body bolster being flared upwardly and the opening of the truck bolster being flared downwardly; of a combined locking center pin including a central cylindrical member and a pair of counterpart outer sections fitting about said central member, said central member and outer sections extending through the openings of both bolsters and said outer sections fitting said openings, clearance being provided at the meeting faces of said outer sections to permit relative tilting movement of the same when said central member is omitted to facilitate insertion of the outer sections through said pin receiving openings.

8. In car construction, the combination with body and truck bolsters having vertically aligned center pin receiving openings together defining a vertically disposed bore adapted to accommodate a combined locking center pin, said bore being of substantially circular cross section intermediate the top and bottom ends thereof and said top and bottom end portion being of larger cross-sectional area than said intermediate portion; of a combined locking center pin, including a central filler member and a pair of outer sections fitting about said filler member, said outer sections extending through the openings of both bolsters and substantially fitting the same, said outer members being cut away at one set of ends on their inner sides to permit tilting in a vertical plane and having the outer surface portions at opposite sides thereof cut away to clear the walls of said circular portion of the bore as the outer sections are inserted upwardly through said pin receiving openings.

In witness that I claim the foregoing I have hereunto subscribed my name this 11th day of April, 1929.

STACY B. HASELTINE.